(12) United States Patent
Hurley et al.

(10) Patent No.: US 9,082,100 B2
(45) Date of Patent: Jul. 14, 2015

(54) ENHANCED LOCATION INFORMATION FOR POINTS OF INTEREST

(71) Applicant: UNITED PARCEL SERVICE OF AMERICA, INC., Atlanta, GA (US)

(72) Inventors: Shawn Patrick Hurley, Timonium, MD (US); Stephen Myron Snyder, Bel Air, MD (US); Robert Edward Trevillian, IV, Glen Burnie, MD (US); Terry Alan Fry, Baltimore, MD (US)

(73) Assignee: UNITED PARCEL SERVICE OF AMERICA, INC.

( * ) Notice: Subject to any disclaimer, the term of this patent is extended or adjusted under 35 U.S.C. 154(b) by 0 days.

(21) Appl. No.: 14/148,056

(22) Filed: Jan. 6, 2014

(65) Prior Publication Data

US 2014/0121959 A1    May 1, 2014

Related U.S. Application Data

(60) Continuation of application No. 13/739,403, filed on Jan. 11, 2013, now Pat. No. 8,751,153, which is a division of application No. 12/878,342, filed on Sep. 9, 2010, now Pat. No. 8,725,407.

(60) Provisional application No. 61/259,328, filed on Nov. 9, 2009.

(51) Int. Cl.
| | |
|---|---|
| *G01C 21/00* | (2006.01) |
| *G06Q 10/08* | (2012.01) |
| *G01C 21/32* | (2006.01) |
| *G09B 29/10* | (2006.01) |
| *G01C 21/34* | (2006.01) |

(52) U.S. Cl.
CPC .......... *G06Q 10/08355* (2013.01); *G01C 21/32* (2013.01); *G01C 21/343* (2013.01); *G06Q 10/08* (2013.01); *G09B 29/106* (2013.01)

(58) Field of Classification Search
CPC .... G01C 21/26; G01C 21/3446; G01C 21/32; G01C 21/36; G08G 1/096827
USPC ......................................................... 701/410
See application file for complete search history.

(56) References Cited

U.S. PATENT DOCUMENTS

| | | | | | |
|---|---|---|---|---|---|
| 4,992,947 | A | * | 2/1991 | Nimura et al. ................ | 701/414 |
| 5,170,353 | A | * | 12/1992 | Verstraete ..................... | 701/423 |
| 5,272,638 | A | * | 12/1993 | Martin et al. ............. | 455/456.5 |

(Continued)

FOREIGN PATENT DOCUMENTS

EP          1788495          5/2007

OTHER PUBLICATIONS

119 Caller Location Information System, dated Sep. 3, 2010; http://proceedings.esri.com-library.

(Continued)

*Primary Examiner* — Ian Jen
(74) *Attorney, Agent, or Firm* — Alston & Bird LLP

(57) ABSTRACT

Systems, methods, and computer program products are provided for identifying a serviceable address that is associated with a street network connection point and an actual location point. For example, in one embodiment, the serviceable address may be associated with a street network connection point that is part of a digital map. The serviceable address may also be associated with an actual location point, such as a parcel drop-off point.

24 Claims, 7 Drawing Sheets

(56) References Cited

U.S. PATENT DOCUMENTS

| | | | |
|---|---|---|---|
| 5,470,233 A | | 11/1995 | Fruchterman et al. |
| 5,544,061 A | | 8/1996 | Morimoto et al. |
| 5,559,707 A | * | 9/1996 | DeLorme et al. ............ 701/467 |
| 5,587,911 A | * | 12/1996 | Asano et al. .................. 701/428 |
| 5,680,312 A | | 10/1997 | Oshizawa et al. |
| 5,774,828 A | | 6/1998 | Brunts et al. |
| 5,798,733 A | | 8/1998 | Ethridge |
| 5,802,492 A | | 9/1998 | DeLorme et al. |
| 5,831,860 A | | 11/1998 | Foladare et al. |
| 5,874,905 A | * | 2/1999 | Nanba et al. .............. 340/995.2 |
| 5,887,269 A | | 3/1999 | Brunts et al. |
| 5,931,888 A | * | 8/1999 | Hiyokawa ..................... 701/428 |
| 5,968,109 A | * | 10/1999 | Israni et al. ................... 701/532 |
| 5,987,381 A | | 11/1999 | Oshizawa |
| 6,002,981 A | * | 12/1999 | Kreft ............................ 701/446 |
| 6,064,941 A | * | 5/2000 | Nimura et al. ................ 701/416 |
| 6,108,603 A | * | 8/2000 | Karunanidhi ................. 701/532 |
| 6,112,200 A | | 8/2000 | Livshutz et al. |
| 6,115,669 A | | 9/2000 | Watanabe et al. |
| 6,163,748 A | | 12/2000 | Guenther |
| 6,178,377 B1 | * | 1/2001 | Ishihara et al. ............... 701/446 |
| 6,201,544 B1 | * | 3/2001 | Ezaki ............................ 345/419 |
| 6,232,915 B1 | | 5/2001 | Dean et al. |
| 6,249,740 B1 | * | 6/2001 | Ito et al. ....................... 701/420 |
| 6,336,073 B1 | | 1/2002 | Ihara et al. |
| 6,356,838 B1 | | 3/2002 | Paul |
| 6,421,605 B1 | * | 7/2002 | Steiner et al. ................. 701/533 |
| 6,456,933 B1 | | 9/2002 | Hessing |
| 6,459,986 B1 | * | 10/2002 | Boyce et al. .................. 701/533 |
| 6,498,982 B2 | * | 12/2002 | Bellesfield et al. ........... 701/533 |
| 6,571,213 B1 | | 5/2003 | Altendahl et al. |
| 6,581,004 B2 | * | 6/2003 | Mori et al. .................... 701/420 |
| 6,587,785 B2 | * | 7/2003 | Jijina et al. ................... 701/414 |
| 6,598,748 B2 | * | 7/2003 | Mileaf et al. .................. 209/542 |
| 6,741,927 B2 | | 5/2004 | Jones |
| 6,748,318 B1 | | 6/2004 | Jones |
| 6,754,582 B1 | | 6/2004 | Smith et al. |
| 6,763,299 B2 | | 7/2004 | Jones |
| 6,804,606 B2 | | 10/2004 | Jones |
| 6,812,888 B2 | * | 11/2004 | Drury et al. .............. 342/357.31 |
| 6,859,722 B2 | | 2/2005 | Jones |
| 6,904,359 B2 | | 6/2005 | Jones |
| 6,937,992 B1 | | 8/2005 | Benda et al. |
| 6,975,938 B2 | | 12/2005 | Odagawa et al. |
| 6,980,885 B2 | | 12/2005 | Ye et al. |
| 7,089,110 B2 | | 8/2006 | Pechatnikov et al. |
| 7,197,500 B1 | * | 3/2007 | Israni et al. ................... 707/809 |
| 7,212,976 B2 | | 5/2007 | Scheer |
| 7,251,612 B1 | * | 7/2007 | Parker et al. ................. 705/7.22 |
| 7,295,924 B2 | | 11/2007 | Smith et al. |
| 7,324,666 B2 | * | 1/2008 | Zoken et al. .................. 382/113 |
| 7,383,125 B2 | * | 6/2008 | de Silva et al. ............... 701/532 |
| 7,587,345 B2 | * | 9/2009 | Mann et al. ...................... 705/28 |
| 7,660,666 B2 | | 2/2010 | Finn et al. |
| 7,667,604 B2 | | 2/2010 | Ebert et al. |
| 7,737,857 B2 | | 6/2010 | Ebert et al. |
| 7,797,104 B2 | | 9/2010 | Finn et al. |
| 7,969,306 B2 | | 6/2011 | Ebert et al. |
| 2002/0165665 A1 | * | 11/2002 | Kim ............................ 701/209 |
| 2004/0158398 A1 | | 8/2004 | Chen et al. |
| 2005/0051623 A1 | | 3/2005 | Okuda et al. |
| 2005/0107993 A1 | * | 5/2005 | Cuthbert et al. .................. 703/2 |
| 2005/0137789 A1 | * | 6/2005 | Furukawa ..................... 701/202 |
| 2006/0235739 A1 | * | 10/2006 | Levis et al. ....................... 705/9 |
| 2007/0250264 A1 | * | 10/2007 | Sekine et al. ................. 701/208 |
| 2008/0021642 A1 | * | 1/2008 | Furukawa ..................... 701/210 |
| 2009/0271722 A1 | * | 10/2009 | Park .............................. 715/765 |
| 2010/0030466 A1 | | 2/2010 | Rogers et al. |
| 2014/0121959 A1 | * | 5/2014 | Hurley et al. ................. 701/410 |
| 2014/0143171 A1 | * | 5/2014 | Hurley et al. ................. 705/338 |

OTHER PUBLICATIONS

A hand-held data logger with integral GPS for producing weed maps by field walking; Computers and Electronics in Agriculture 14 (1996) pp. 235-247.

Bearing Straight; http://www.forbes.com-forbes-life-magazine-1998.

Personal Navigation System for the Visually Impaired, by Charles M. LaPierre; Department of Electronics, Faculty of Engineering Carleton University, Masters Project, dated Sep. 3, 1998.

Personal Navigation System for the Visually Impaired, by Charles M. LaPierre; Department of Electronics, Faculty of Engineering Carleton University, Senior Project dated Sep. 3, 1998.

Fire Hydrant Maintenance Using GPS and GIS by David Allen; http://proceedings.esri.com-library, Sep. 7, 2010.

Tracer: In-vehicle, GPS-based, Wireless Technology for Traffic Surveillance and Management, University of California, Irvine, dated Jul. 2003.

Location-aware information delivery with *comMotion*. MIT Media laboratory, HUC 2000 Proceedings, pp. 157-171.

Moving Beyond Observed Outcomes: Integrating Global Positioning Systems and Interactive Computer-Based Travel Behaviour Surveys; *Transportation Research Circular: Personal Travel: The Long and Short of it*. Transportation Research Board, National Research Council, Washington, D.C.

Orientation and Implementing The Global Positioning System, Division of Rehabilitation, University of Illinois. 1989 IEEE.

Personalization of the Automotive Information Environment, Daimler-Benz Research and Technology Center and Computational Learning Laboratory by Seth Rogers, Pat Langley, Bryan Johnson and Annabel Liu.

Informal Summary of the Results of the First Phase of the ORION Validity Search.

Where on Earth am I? Don't Worry, GPS Satellites will Guide you. Written by Makarand Phatak, dated Sep. 1998.

International Search Report and Written Opinion for PCT/US2010/048562, dated Jan. 13, 2011.

United States Patent and Trademark Office, Office Action for U.S. Appl. No. 13/070,682, dated Nov. 23, 2012, 16 pages, USA.

United States Patent and Trademark Office, Office Action for U.S. Appl. No. 12/878,342, dated Feb. 13, 2013, 16 pages, USA.

United States Patent and Trademark Office, Office Action for U.S. Appl. No. 13/070,686, dated Feb. 25, 2013, 19 pages, USA.

United States Patent and Trademark Office, Notice of Allowance for U.S. Appl. No. 12/878,342, dated Dec. 26, 2013, 9 pages, USA.

United States Patent and Trademark Office, Notice of Allowance for U.S. Appl. No. 13/070,686, dated Nov. 29, 2013, 10 pages, USA.

United States Patent and Trademark Office, Office Acion for U.S. Appl. No. 14/164,537, Sep. 2, 2014, 17 pages, USA.

Canadian Intellectual Property Office, Office Action for Application No. 2,780,129, Mar. 26, 2014, 3 pages, Canada.

United States Patent and Trademark Office, Office Action for U.S. Appl. No. 14/164,537, dated Apr. 29, 2014, 16 pages, USA.

United States Patent and Trademark Office, Notice of Allowance for U.S. Appl. No. 13/070,682, dated May 30, 2014, 14 pages, USA.

State Intellectual Property Office of the P.R.C., First Office Action for Application No. 201080050584.3, May 29, 2014, 6 pages, China.

European Patent Office, Communication Pursuant to Article 94(3) EPC for Application No. 10760520.6, Jun. 23, 2014, 6 pages, The Netherlands.

* cited by examiner

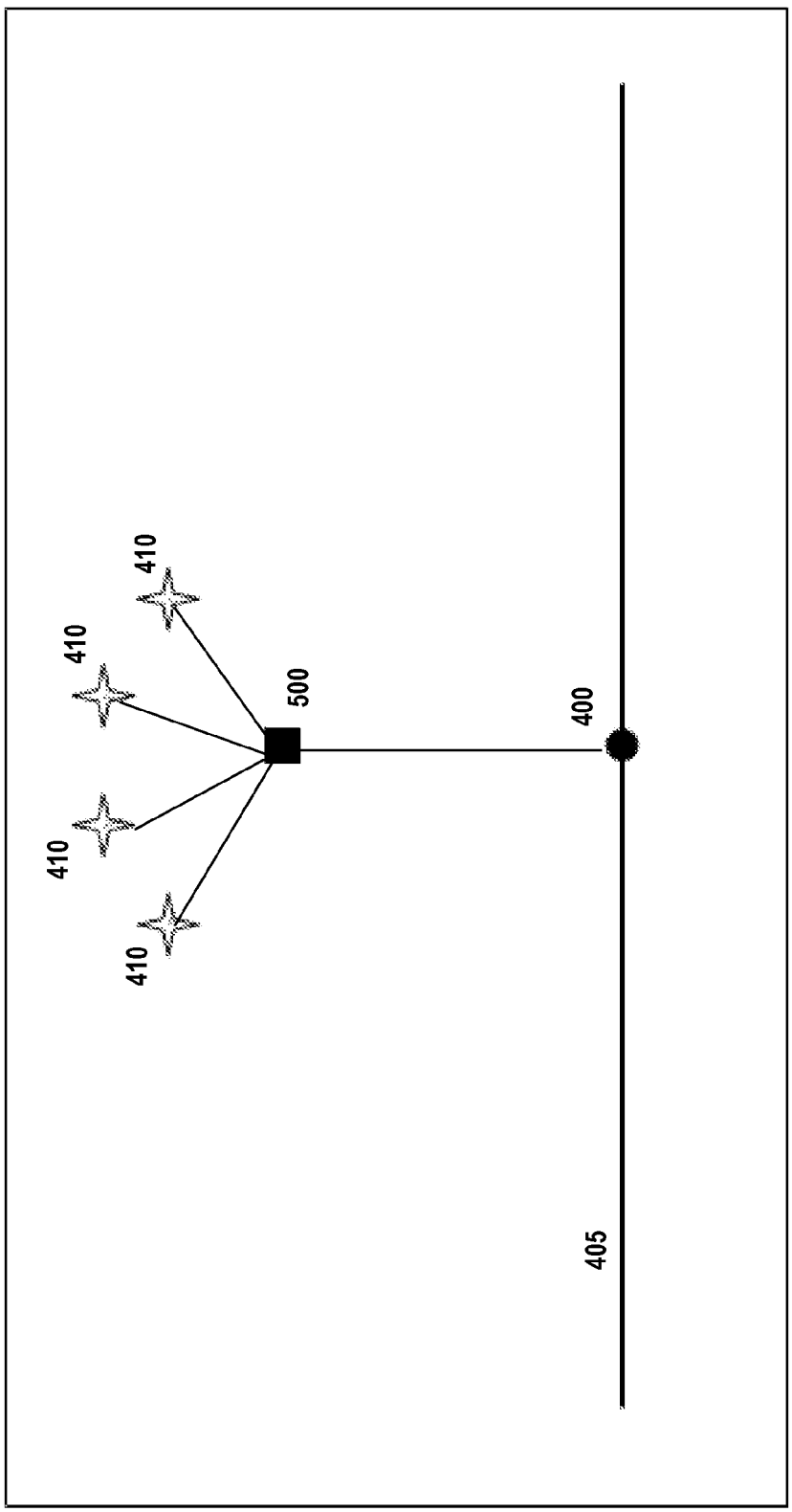

FIG. 6A

DROP-OFF POINT OBJECT
- SERVICEABLE ADDRESS
- LAT / LONG
- LAT / LONG TYPE
- DROP-OFF POINT LAT / LONG
- DISTANCE TO STREET NETWORK
- TIME TO STREET NETWORK
- SPEED TO STREET NETWORK

FIG. 6B

DROP-OFF POINT OBJECT
- SERVICEABLE ADDRESS
- NAME

PARKING POINT OBJECT
- LAT / LONG
- LAT / LONG TYPE
- PARKING POINT LAT / LONG
- DISTANCE TO STREET NETWORK
- TIME TO STREET NETWORK
- SPEED TO STREET NETWORK

ENHANCED LOCATION INFORMATION FOR POINTS OF INTEREST

CROSS-REFERENCE TO RELATED APPLICATIONS

This application is continuation of U.S. application Ser. No. 13/739,403 with a filing date of Jan. 11, 2013, which is a division of U.S. application Ser. No. 12/878,342 with a filing date of Sep. 9, 2010, which claims priority to U.S. Appl. No. 61/259,328 with a filing date of Nov. 9, 2009, both of which are hereby incorporated herein in their entireties by reference.

BACKGROUND

Map vendors, such as Tele Atlas® and NAVTEQ®, provide digital maps to a variety of clients for different purposes. For example, such companies may provide digital maps to: (a) Internet websites for providing driving directions to consumers; (b) cellular companies to include in phones and personal digital assistants; (c) government agencies (e.g., the United States Department of Agriculture and Environmental Protection Agency) for use in their respective government functions; and (d) transportation and logistics companies, such as United Parcel Service of America, Inc. ("UPS"), for determining and optimizing delivery routes. Unfortunately, the digital maps provided by vendors do not include precise location information about particular points of interest. For example, although digital maps can be used to provide navigational information to points of interest with little inaccuracy, they do not include, for example, the actual longitude and latitude coordinates associated with commercial and residential addresses. Thus, to provide directions to a point of interest, methods such as interpolation are used to approximate where a point of interest or address is on a street in association with a digital map. Such approximations typically introduce minor inaccuracies into the navigational information, such as indicating that an address is 1/10 of a mile further down a street than it actually is located. For transportation and logistics companies and other entities, precision of delivery locations is a paramount concern. Accordingly, minor inaccuracies in directions or errors in a digital map can greatly impact a company's efficiency. Thus, there is a need to provide additional location information for various points of interests.

SUMMARY

In general, embodiments of the present invention provide systems, methods, apparatus, and computer program products for providing additional location information for various points of interests.

In accordance with one aspect, an apparatus for providing additional location information for various points of interests is provided. In one embodiment, the apparatus may comprise at least one processor and at least one memory including program code, the at least one memory and the program code configured to, with the processor, cause the apparatus to at least (1) receive actual location point information collected for a serviceable address, (a) the serviceable address being associated with street network connection information as part of a digital map, (b) the street network connection information comprising a street network connection point for the serviceable address, and (c) the actual location point information being collected during one or more visits to the serviceable address; (2) determine an actual location point for the serviceable address based at least in part on the actual location point information collected during the one or more visits to the serviceable address; and (3) store a record for the serviceable address comprising the actual location point and the street network connection point.

In accordance with another aspect, a computer program product for providing additional location information for various points of interests is provided. The computer program product may comprise at least one computer-readable storage medium having computer-readable program code portions stored therein, the computer-readable program code portions comprising executable portions configured to (1) receive actual location point information collected for a serviceable address, (a) the serviceable address being associated with street network connection information as part of a digital map, (b) the street network connection information comprising a street network connection point for the serviceable address, and (c) the actual location point information being collected during one or more visits to the serviceable address; (2) determine an actual location point for the serviceable address based at least in part on the actual location point information collected during the one or more visits to the serviceable address; and (3) store a record for the serviceable address comprising the actual location point and the street network connection point.

In accordance with yet another aspect, a method for providing additional location information for various points of interests is provided. In one embodiment, the method comprises (1) receiving actual location point information collected for a serviceable address, (a) the serviceable address being associated with street network connection information as part of a digital map, (b) the street network connection information comprising a street network connection point for the serviceable address, and (c) the actual location point information being collected during one or more visits to the serviceable address; (2) determining an actual location point for the serviceable address based at least in part on the actual location point information collected during the one or more visits to the serviceable address; and (3) storing a record for the serviceable address comprising the actual location point and the street network connection point.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4-5 are serviceable addresses according to one embodiment of the present invention.

FIGS. 6A-6B are exemplary data objects that can be used with embodiments of the present invention.

DETAILED DESCRIPTION

Figure 1:
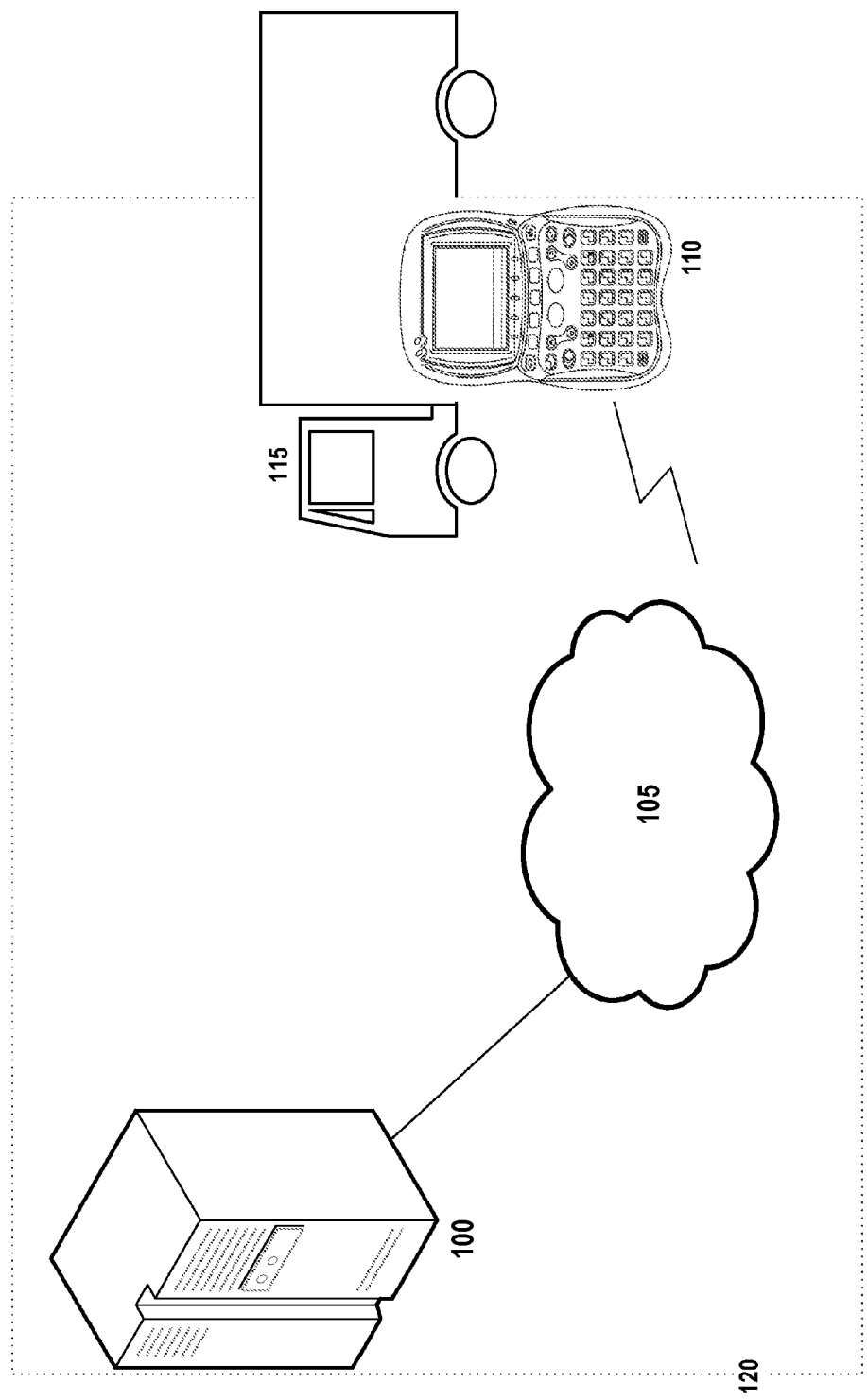
FIG. 1 is an overview of one embodiment of a system that can be used to practice aspects of the present invention.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, the embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. GENERAL OVERVIEW

In general, according to various embodiments of the present invention, methods, apparatus, systems, and computer program products are provided for increasing the accuracy of information associated with points of interests, such as serviceable addresses. This may include associating a serviceable address with (a) latitude and longitude coordinates of a first location within a network of streets of a digital map (e.g., the start of a driveway from a street of the serviceable address) and (b) latitude and longitude coordinates of a second location outside of the network of streets of the digital map (e.g., the end of the driveway near the front door of a house of the serviceable address). To provide routing information to the serviceable address, in one embodiment, the process begins by identifying the serviceable address (e.g., a location for a delivery vehicle visit, such as a parcel pickup or delivery). After identifying the serviceable address, information associated with the serviceable address is identified (e.g., the latitude and longitude coordinates of the first and second locations). In one embodiment, with coordinates of the first and second locations, the total time and distance to the serviceable address is determined, for example, by determining the distance from an origin point to the first location and from the first location to the second location. This process can be performed for several serviceable addresses to (a) closely determine an estimated time and distance for visiting each serviceable address and (b) optimize a parcel pickup/delivery route.

III. EXEMPLARY SYSTEM ARCHITECTURE

FIG. 1 provides an illustration of one type of system 120 that can be used in conjunction with various embodiments of the present invention. As shown in FIG. 1, the system may include a mapping system 100, a network 105, a handheld electronic device 110, and a delivery vehicle 115 equipped with various electronic devices. Each of these components of the system may be in electronic communication with, for example, one another over the same or different wireless or wired networks including, for example, a wired or wireless Personal Area Network ("PAN"), Local Area Network ("LAN"), Metropolitan Area Network ("MAN"), Wide Area Network ("WAN"), or the like. Additionally, while FIG. 1 illustrates the various system entities as separate, standalone entities, the various embodiments are not limited to this particular architecture.

A. Exemplary Mapping System

Figure 2:
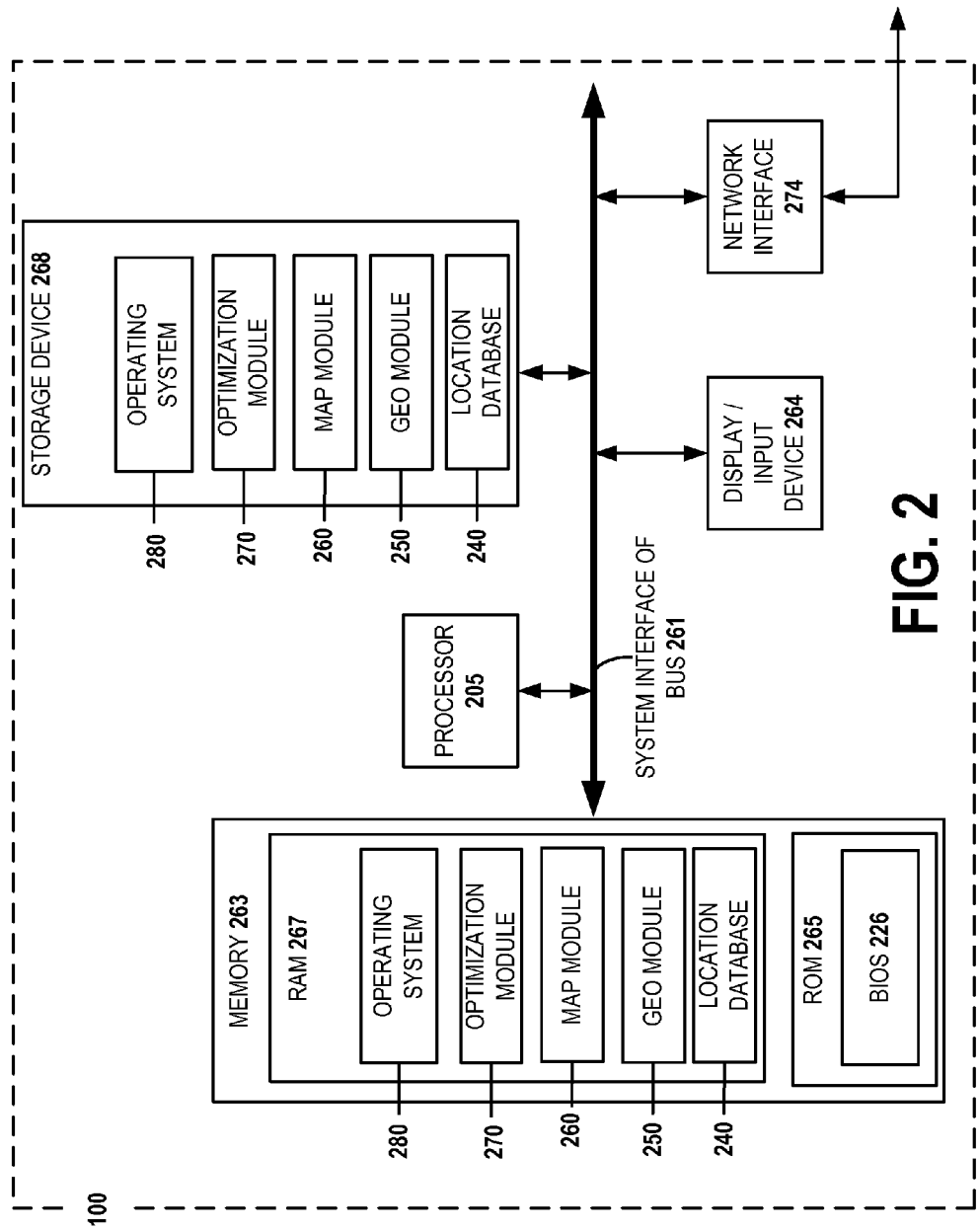
FIG. 2 is a mapping system according to one embodiment of the present invention.

FIG. 2 is a schematic diagram of a mapping system 100 according to one embodiment of the present invention. In general, the term "system" may refer to any computer, computing device, desktop, notebook or laptop, distributed system, server, gateway, switch, or other processing device adapted to perform the functions described herein. As will be understood from this figure, in this embodiment, the mapping system 100 includes a processor 205 that communicates with other elements within the mapping system 100 via a system interface or bus 261. The processor 205 may be embodied in a number of different ways. For example, the processor 205 may be embodied as various processing means such as a processing element, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention while configured accordingly.

A display device/input device 264 for receiving and displaying data is also included in the mapping system 100. This display device/input device 264 may be, for example, a keyboard or pointing device that is used in combination with a monitor. The mapping system 100 further includes memory 263, which may include both read only memory ("ROM") 265 and random access memory ("RAM") 267. The mapping system's ROM 265 may be used to store a basic input/output system ("BIOS") 226 containing the basic routines that help to transfer information to the different elements within the mapping system 100.

In addition, in one embodiment, the mapping system 100 includes at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280, an optimization module 270, a map module 260, and a geo module 250. These modules may control certain aspects of the operation of the mapping system 100 with the assistance of the processor 205 and operating system 280—although their functionality need not be modularized. In addition to the program modules, the mapping system 100 may store or be connected to one or more databases, such as a location database 240, with one or more tables stored therein. The term "database" refers to a structured collection of records or data that is stored in a computer system, such as via a relational database, hierarchical database, or network database.

Also located within the mapping system 100, in one embodiment, is a network interface 274 for interfacing with the handheld electronic device 110 or various other computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the mapping system 100 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the mapping system's 100 components may be located remotely from other mapping system 100 components. Furthermore, one or more of the components may be combined and additional components performing functions described herein may be included in the mapping system 100.

B. Exemplary Handheld Electronic Device

Figure 3:
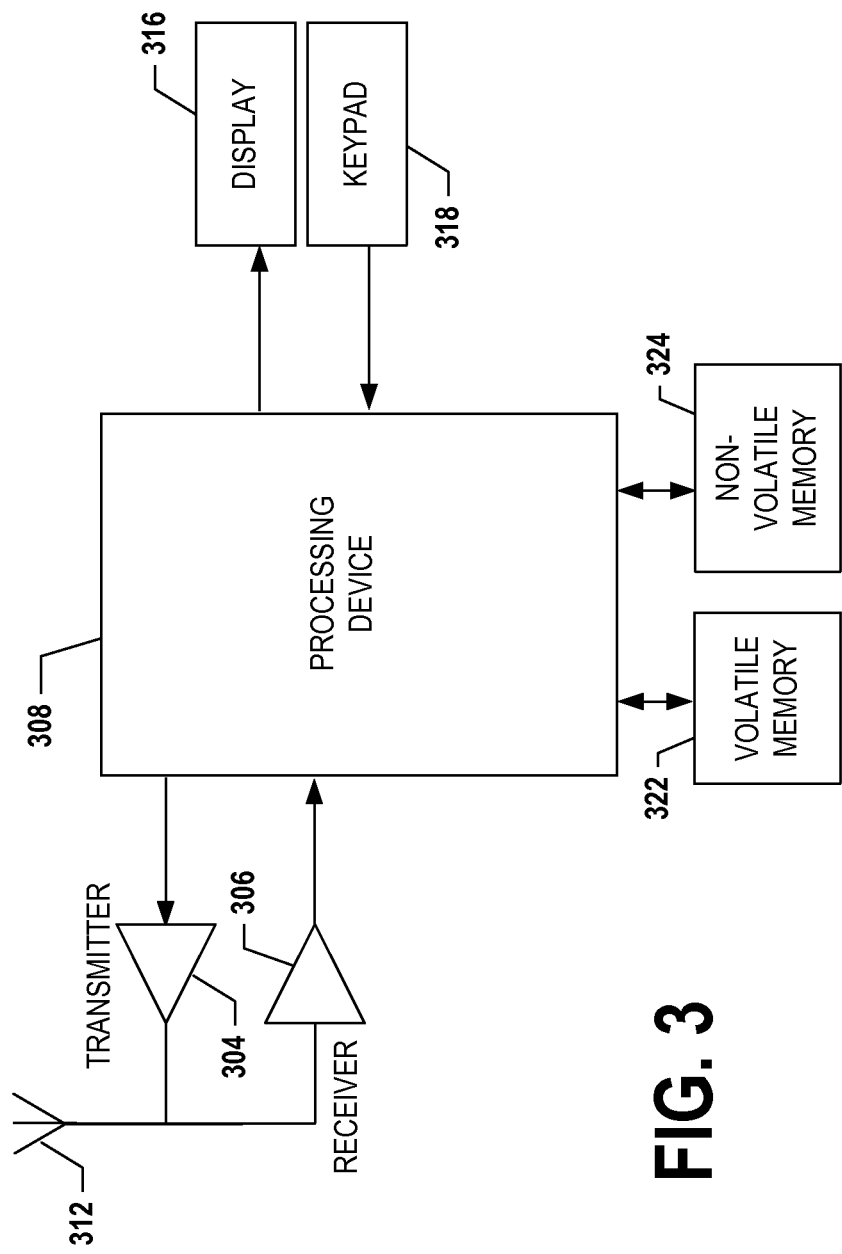
FIG. 3 is a handheld electronic device according to one embodiment of the present invention.

With respect to the handheld electronic device 110 ("handheld"), FIG. 3 provides an illustrative schematic representative of a handheld 110 that can be used in conjunction with the embodiments of the present invention. As shown in FIG. 3, the handheld 110 can include an antenna 312, a transmitter 304, a receiver 306, and means, such as a processing device 308, e.g., a processor, controller, or the like, that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the handheld 110 may be capable of operating with one or more air interface standards, communication protocols, modulation types, and access types. More particularly, the handheld 110 may operate in accordance with any of a number of second-generation ("2G") communication protocols, third-generation ("3G") communication protocols, and/or the like. Further, for example, the handheld 110 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the handheld 110 can communicate with the mapping system 100 and/or various other entities. The handheld can also download changes, add-ons, and updates, for instance, to its firmware, software (e.g., including modules), and operating system.

The handheld 110 may also comprise a user interface (that can include a display 316 coupled to a processing device 308) and/or a user input interface (coupled to the processing device 308). The user input interface can comprise any of a number of devices allowing the handheld 110 to receive data, such as a keypad 318, a touch display (not shown), barcode reader (not shown), radio frequency identification ("RFID") tag reader (not shown), or other input device. In embodiments including a keypad 318, the keypad 318 can include the conventional numeric (0-9) and related keys (#, *), and other keys used for operating the handheld 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the handheld 110 may also include a battery, such as a vibrating battery pack, for powering the various circuits that are required to operate the handheld 110, as well as optionally providing mechanical vibration as a detectable output.

The handheld 110 can also include volatile memory 322 and/or non-volatile memory 324, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the handheld 110 to implement the functions of the handheld 110. The memory can also store content, such as computer program code for an application and/or other computer programs.

The handheld 110 may also include a Global Positioning System ("GPS") module adapted to acquire, for example, latitude, longitude, altitude, geocode, course, speed, universal time ("UTC"), and date information. This information may be acquired in the National Electrical Manufacturers Association ("NEMA") data format or in any other appropriate data format. In one embodiment, the GPS sensor acquires data, sometimes known as ephemeris data, identifying the number of satellites in view and the relative positions of those satellites. In addition, data regarding, for example, heading and ETA can also be captured, which enhances the determination of the position of the GPS sensor and allows an area to be profiled or segmented based on the common characteristics of the data.

C. Exemplary Delivery Vehicle

Although not shown, the delivery vehicle 115 may include sensors installed on or about the delivery vehicle 115. The sensors may include telematics sensors, such as engine, door, and speed sensors so as to allow a delivery vehicle computing device (not shown) to gather parcel delivery details, GPS information, and/or other position data and delivery data. The sensors may communicate with the delivery vehicle computing device, the handheld 110, or the mapping system 100 via one or more communications networks. Additionally, one or more user interface devices may be installed on or about the delivery vehicle 115 so as to allow communication between a driver of the delivery vehicle 115 and the delivery vehicle computing device, the handheld 110, or the mapping system 100. For example, a heads-up display may be provided to present information, such as GPS information, to the driver as the driver is sitting in the driver's seat of the delivery vehicle.

IV. EXEMPLARY SYSTEM OPERATION

Figure 4:
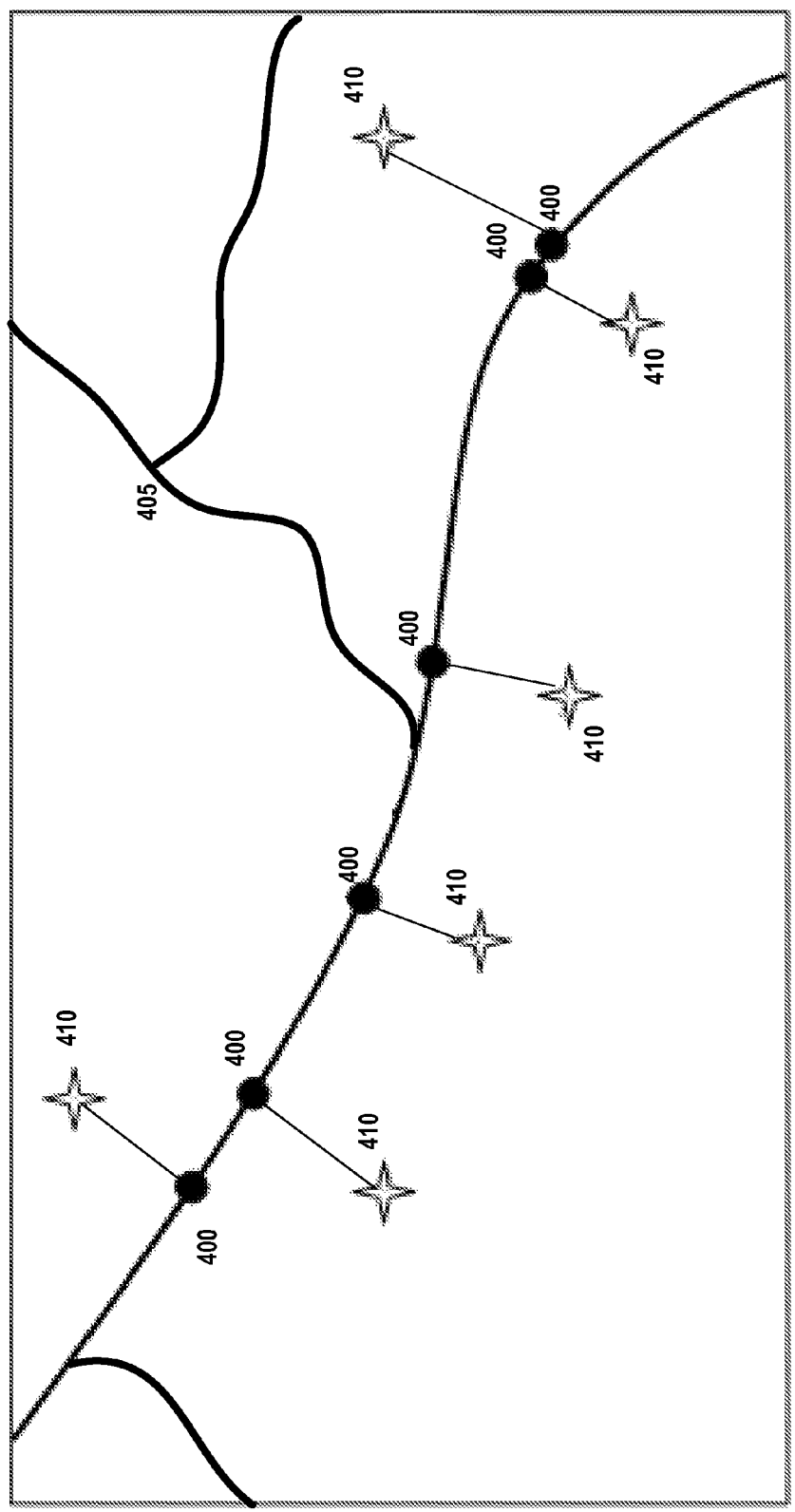
Figure 7:
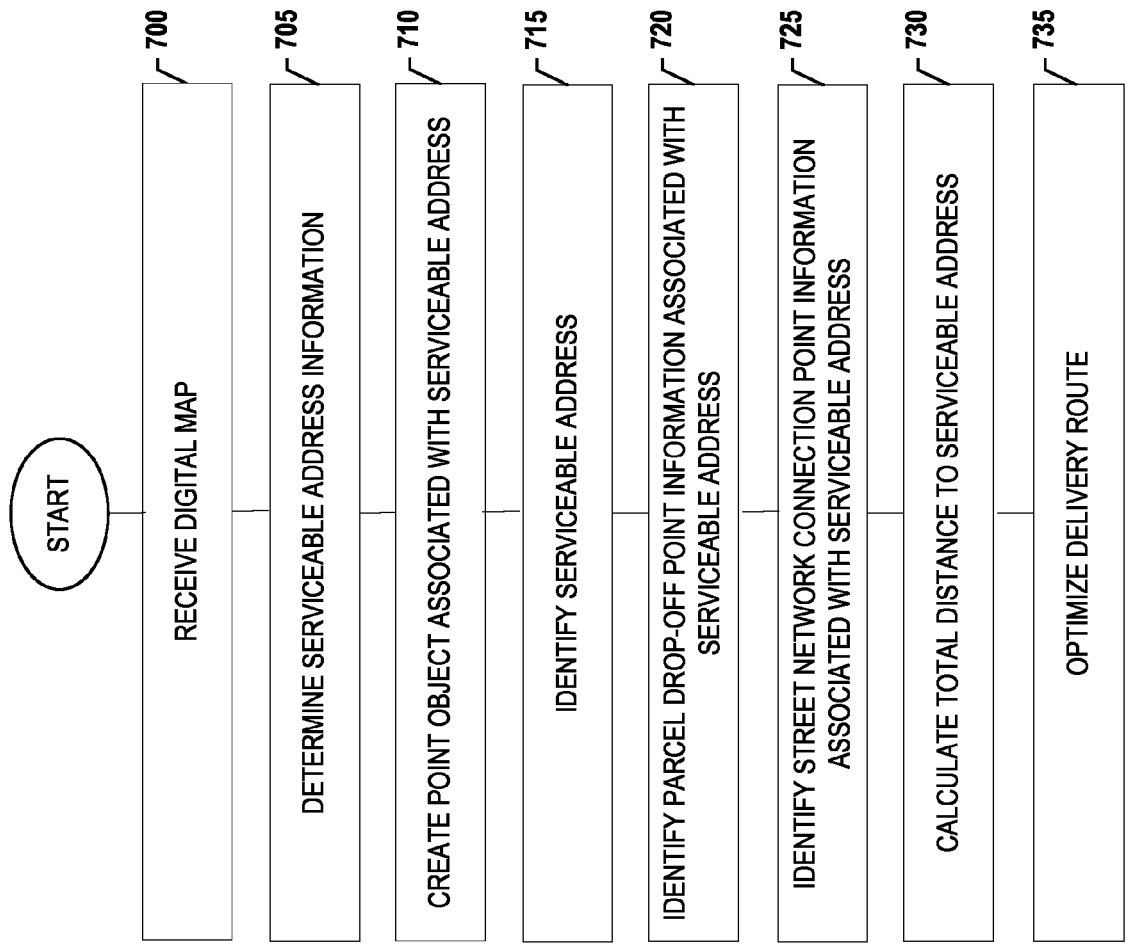
FIG. 7 is a flowchart illustrating operations and processes that can be used in accordance with various embodiments of the present invention.

Reference will now be made to FIGS. 4-5, 6A-6B, and 7, which provide exemplary serviceable addresses, data objects, and operations used in various embodiments of the present invention. A "serviceable address" may be any location associated with an address or other identifiable location. FIGS. 4-5 show exemplary serviceable addresses. FIGS. 6A-6B show exemplary data objects associated with serviceable addresses. FIG. 7 provides a flowchart illustrating operations that may be performed to provide more accurate information regarding a serviceable address. For illustrative purposes, concepts of the present invention are discussed in the context of delivering a parcel; however, it should be noted that various embodiments of the present invention are applicable to a wide range of services and activities outside the parcel delivery context.

A. Exemplary Map Information

In one embodiment, transportation and logistics companies, such as UPS, license, purchase, and/or use digital maps from vendors like Tele Atlas® and NAVTEQ®. Companies receive digital maps that may include map data regarding streets, roads, avenues, bridges, highways, interstates, points of interest, geographic landmarks, and the like (Block 700 of FIG. 7). A collection of navigable roads, streets, highways, and the like represented in a digital map are referred to herein as a "street network" 405 (shown in FIGS. 4 and 5). Based on the street network 405, the map data of the digital map can be used to provide directions for traveling within a street network 405 to a particular destination, such as to provide directions for traveling to a particular serviceable address to deliver a parcel.

As indicated, digital maps can be used to provide information for traveling, for example, from point A to point B. To do so, digital maps may include information such as street segments, altitude, longitude, latitude, speed limits, direction restrictions, and time penalties or other information associated with a street network 405 or segments of a street network 405. For example, a street may be represented by a street name, an address range, and series of longitude and latitude coordinates that define the overall shape and location of the street. To determine directions for traveling from point A to point B, it should be noted that, in this example, (a) the digital map does not provide the precise location as to where a particular serviceable address is located on, for example, a given street, road, or avenue (e.g., it assumes a linear distribution of addresses on the given street, road, or avenue) and (b) it is assumed that both the start location of point A and the end location of point B are actually located on the street network 405 of the digital map. For example, if a street is assigned an address range from 1-100 and directions are needed to a serviceable address associated with the number 50 on the street, the map data is used to approximate where on the street the serviceable address associated with the number 50 is located. Using interpolation, for example, it will be determined that the serviceable address associated with the number 50 is located in the middle of the street segment as determined using the segment's length. So, for instance, if the segment is a mile long, it will be determined that serviceable address associated with the number 50 is ½ mile down the street segment as measured from the beginning of the street segment. In other words, the map data assumes a linear distribution of addresses in the street network 405 and does not provide for precise location information regarding the individual addresses. Once used to provide approximate directions to a serviceable address, given the lack of information in the digital map, it also must be assumed that the serviceable address is located on the street network 405. For example, if a particular commercial building associated with a serviceable address is located on a driveway ²/₁₀ of a mile off of the street network 405, the digital map data will not reflect this added driving distance and accordingly will not account for the specific connection location to the street network 405, added travel time, and travel distance.

In addition to the above-noted limitations of digital maps, digital maps may also contain errors that can even further exacerbate inaccuracies in, for example, routing applications used by transportation and logistics companies. For instance, digital maps may include street segments that do not exist and/or omit street segments that do exist. Similarly, digital maps often contain errors that include reversed high and low numbers for a street segment, reversed odd and even numbers for a street segment, and inaccurate high and low numbers for a street segment. Such errors often go unnoticed by most consumers because they can usually still arrive at their desired destinations even if the directions are inaccurate, such as requiring them to travel an extra ¹/₁₀ of mile longer on a street than was indicated. However, for transportation and logistics companies and other entities, such minor inaccuracies can lead to inefficient planning for parcel deliveries and non-optimized delivery routes.

B. Exemplary Parcel Drop-Off Points, Street Network Connection Points, and Vehicle Parking Points In one embodiment, a serviceable address is associated with one or more "parcel drop-off points" and one or more "street network connection points." A parcel drop-off point 410 may be a location (e.g., driveway, house, or building) at which, for example, a parcel (or any deliverable object, such as freight) is actually delivered with regard to a given serviceable address (within or outside of a street network 405). For instance, the parcel drop-off point 410 may indicate the location of a house or front door of a house that is associated with a serviceable address outside of a street network 405, which may require a driver to travel on a driveway that extends ²/₁₀ of a mile off of the street network 405. A street network connection point 400 may be a location (e.g., the start of a driveway or entrance to a commercial parking lot) at which, for example, the serviceable address connects to the street network 405. For instance, FIG. 4 shows six serviceable addresses, with each serviceable address being associated with a parcel drop-off point 410 and a street network connection point 400. In the examples of FIG. 4, the parcel drop-off points 410 are locations that are not located within the street network 405. In these examples, the street network connection points 400 are where the driver of the delivery vehicle 115 (e.g., driving or walking) exits the street network 405 to travel to the parcel drop-off point 410 (e.g., where the driveway begins). Thus, as an illustration, in one embodiment, (a) a street network connection point 400 may be where the driver of the delivery vehicle 115 would exit the street network 405 to deliver a parcel (e.g., walking or driving up the start of a driveway from a street on a street network 405) and (b) a parcel drop-off point 410 may be where the driver actually delivers the parcel (e.g., the front door of a house where the driver scans the parcel and indicates the parcel as being delivered).

The foregoing describes an embodiment in which the parcel drop-off point 410 is not located within a street network 405. However, in some embodiments, the parcel drop-off point 410 may be located within the street network 405. For instance, in the above examples, the parcel drop-off point 410 and street network connection point 400 identify distinct locations associated with a serviceable address. In other embodiments, though, it is contemplated that the parcel drop-off point 410 may be located within a street network 405, and, in such cases, the parcel drop-off point 410 and street network connection point 400 may identify the same location or substantially similar locations for a given serviceable address.

Furthermore, in some embodiments, a serviceable address may be sufficiently identified with a single parcel drop-off point 410 and a single street network connection point 400. This may be the case, for instance, when a serviceable address represents a single dwelling home with one driveway. In other embodiments, multiple street network connection points 400 and/or multiple parcel drop-off points 410 may be necessary for a single serviceable address. For example, multiple street network connection points 400 may be used if there is more than one entrance to travel to a parcel drop-off point 410 from a street network 405, such as a commercial location with entrances on two different streets. Similarly, two parcel drop-off points 410 may be used for a serviceable address, e.g., an automobile dealership with one location for deliveries to the parts department and another location for deliveries to the service department. Thus, this embodiment may include information as to where the delivery vehicle exits the street network 405 and where the driver actually delivers the parcel.

In addition to the above, as indicated in FIG. 5, there may also be instances in which it would be desirable to associate a serviceable address to one or more parcel drop-off points 410, one or more street network connection points 400, and one or more "vehicle parking points." A vehicle parking point 500 may be, for example, a location where a driver of a delivery vehicle 115 can park the delivery vehicle 115 when delivering a parcel to a serviceable address. A vehicle parking point 500 may be used, for example, if a single address is associated with multiple parcel drop-off points accessed by a single parking location (e.g., a mall with deliveries to multiple stores or an apartment complex with deliveries to multiple apartments). Or a vehicle parking point 500 may be used, for instance, if a driver of a delivery vehicle 115 will have to walk a considerable distance to a single parcel drop-off point 410 after parking the delivery vehicle 115 at a location that is not within a certain proximity of the parcel drop-off point 410 (e.g., parking in the parking lot of a commercial building that requires a walk of 1/10 of a mile to the entrance of the commercial building). Thus, continuing with the above example, the (a) street network connection point 400 may be where the driver of the delivery vehicle 115 would exit the street network 405 to deliver a parcel (e.g., the entrance to a mall or apartment complex from a street on a street network 405), (b) vehicle parking point 500 may be where the delivery vehicle driver would park the delivery vehicle 115 to delivery the parcel (e.g., the location the driver parks the delivery vehicle 115 at the mall or apartment complex, such as in a parking lot), and (c) parcel drop-off point(s) 410 may be where the driver actually delivers the parcel (e.g., the locations of one or more apartments or businesses to which the driver delivers parcels). Thus, one embodiment may include information as to where the delivery vehicle exits the street network 405, where the driver parks the delivery vehicle 115, and where the driver actually delivers the parcel.

C. Exemplary Information for Parcel Drop-Off Points, Street Network Connection Points, and Vehicle Parking Points In one embodiment, to identify points at a serviceable address, various information sets can be used. For example, in one embodiment, information associated with a serviceable address may include "parcel drop-off point information" (information about a parcel drop-off point 410 that is associated with the serviceable address), "street network connection point information" (information about a street network connection point 400 that is associated with the serviceable address), and "vehicle parking point information" (information about a vehicle parking point 500 that is associated with the serviceable address). The information associated with the different points can be collected or determined using a variety of techniques and methods (Block 705 of FIG. 7). For example, the street network connection point information may be base data provided by a digital map vendor or may include the digital map vendor's base data combined with point coordinates (e.g., provided by a third party).

i. Exemplary Parcel Drop-Off Point Geo Coordinates

In various embodiments, to adequately identify a serviceable address, parcel drop-off point information (e.g., the geocode or longitude and latitude of the parcel drop-off point 410) may be collected using various methods. For example, in one embodiment, each time a driver of a delivery vehicle 115 visits a parcel drop-off point 410 associated with a serviceable address, a "parcel drop-off point geo coordinate" is determined for the parcel drop-off point 410. The term parcel drop-off point geo coordinate may refer to, for example, information identifying the parcel drop-off point 410 that may include longitude and latitude coordinates, geocodes, altitude, course, speed, distance, UTC, and date information, or the like. This information may be collected, for example, via the delivery vehicle computing device or the handheld 110 (with or without the aid of the driver of the delivery vehicle 115).

Operatively, in one embodiment, the delivery vehicle computing device or handheld 110 provides the functionality to maintain and process location data (such as latitude and longitude data) for locations to which items are delivered or picked up, for example. Accordingly, in one embodiment of the present invention, the handheld 110 is adapted to be used to gather geo coordinate samples at each delivery or pickup at a serviceable address over a period of time. More specifically, the handheld 110 can be configured to collect geo coordinate samples (e.g., GPS readings) continuously or upon determining the occurrence of one or more predefined trigger events. Such predefined trigger events may include, but are not limited to: (1) scan events; (2) an electronic signature capture event; (3) an input to the handheld 110 indicating that the driver has left a particular parcel at serviceable address (e.g., without capturing a signature); (4) an input or event that indicates to the handheld 110 that the current stop is now complete; (5) an input specifically instructing the handheld 110 to capture a sample; (6) when the handheld 110 determines that the delivery vehicle 115 (or driver walking with the handheld 110) has exited the street network 405; (7) when the delivery vehicle 115 is placed in the park position for a delivery or pickup; and/or (8) the like. Thus, for each parcel drop-off point 410 at each serviceable address, one or more geo coordinate samples (e.g., GPS readings) may be taken by the handheld 110 in response to various trigger events.

In one embodiment, similar to the handheld 110 collecting geo coordinate samples, the delivery vehicle computing device can collect geo coordinate samples. For example, the delivery vehicle computing device can continuously collect sample geo coordinates as the delivery vehicle travels along its delivery path. Moreover, the delivery vehicle computing device can also be configured to collect geo coordinate samples in response to predefined trigger events, such as the delivery vehicle 115 exiting the street network 405 and those discussed above with respect to the handheld 110.

As indicated, in one embodiment, the handheld 110 or delivery vehicle computing device is configured to continuously and/or periodically store geo coordinate samples, regardless of whether a trigger event has occurred. This may be beneficial since geo coordinates may not always be available at any given time since, for example, a GPS signal could be temporarily blocked by a nearby obstruction. Thus, for instance, if a trigger event occurs at a time when a geo coordinate is not immediately obtainable, the last known geo coordinate (or in some embodiments the next geo coordinate) can be used. In such embodiments, the handheld 110 or delivery vehicle computing device may store information about the time of the geo coordinate sample and the time of the associated trigger event so that the mapping system 100 may use the information in determining the accuracy of the geo coordinate samples.

There may also be occasions in which it is desirable to determine a parcel drop-off point geo coordinate for a serviceable address for which no geo coordinate samples have been collected. In such a scenario, a variety of methods can be used to determine the parcel drop-off point geo coordinate for a serviceable address. For example, in one embodiment, the parcel drop-off point geo coordinates collected on addresses from either side of a serviceable address is used to interpolate a parcel drop-off point geo coordinate for the serviceable address. Moreover, after approximating the parcel drop-off point geo coordinate for the serviceable address, the actual parcel drop-off point geo coordinate can be determined by the handheld 110 or delivery vehicle computing device upon the completion of the delivery vehicle visit at the serviceable address.

The geo coordinate samples can be uploaded to the mapping system 100, which, after an appropriate number of geo coordinate samples associated with a parcel drop-off point 410, processes the sample geo coordinates and creates a parcel drop-off point geo coordinate for the serviceable address. For example, the mapping system 100 (e.g., via the geo module 250) may be configured to require two, three, or more consistent sample geo coordinates associated with a parcel drop-off point 410 before creating a parcel drop-off point geo coordinate for the serviceable address. Also, it should be noted, that the handheld 110 or delivery vehicle computing device may receive point geo coordinates as input from the driver of the delivery vehicle 115.

ii. Exemplary Vehicle Parking Point Geo Coordinates

In one embodiment, vehicle parking point information (e.g., the geocode or longitude and latitude of the vehicle parking point 500) may be collected using various methods. For example, in one embodiment, each time a driver of a delivery vehicle 115 parks the delivery vehicle in association with a visit to a serviceable address, a "vehicle parking point geo coordinate" can be determined for the serviceable address. The term vehicle parking point geo coordinate may refer to, for example, information identifying the vehicle parking point 500 that may include longitude and latitude coordinates, geocodes, altitude, course, speed, distance, UTC, and date information, or the like. This information may be collected, for example, via the delivery vehicle computing device or the handheld 100 (with or without the aid of the driver of the delivery vehicle 115). As discussed previously, a vehicle parking point 500 may be used, for example, if a serviceable address is associated with multiple parcel drop-off points (e.g., a mall with deliveries to multiple stores or an apartment complex with deliveries to multiple apartments) or if a driver of a delivery vehicle 115 will have to walk a considerable distance to a single parcel drop-off point 410 after parking the delivery vehicle at a location that is not within a certain proximity of the parcel drop-off point 410 (e.g., parking in the parking lot of a commercial building that requires a walk of 1/10 of a mile to the entrance of the commercial building).

As indicated above, in one embodiment, the delivery vehicle computing device or handheld 110 provides the functionality to maintain and process location data. Accordingly, the delivery vehicle computing device or handheld 110 can be used to gather geo coordinate samples at each delivery or pickup at a serviceable address over a period of time. More specifically, the delivery vehicle computing device or handheld 110 can be configured to collect geo coordinate samples (e.g., GPS readings) continuously or upon determining the occurrence of one or more predefined trigger events. Such predefined trigger events may include, but are not limited to: (1) scan events; (2) when the handheld 110 determines that the delivery vehicle (or driver walking with the handheld 110) has exited the street network 405; (3) when the delivery vehicle 115 is placed in the park position for a delivery or pickup; and/or (4) the like. Thus, at a vehicle parking point 500 for each serviceable address, one or more geo coordinate samples (e.g., GPS readings) may be taken by the handheld 110 in response to respective trigger events.

The geo coordinate samples can then be uploaded to the mapping system 100, which, after an appropriate number of geo coordinate samples associated with a vehicle parking point 500, processes the sample geo coordinates and creates a vehicle parking point geo coordinate for the serviceable address. For example, the mapping system 100 may be configured to require two, three, or more consistent sample geo coordinates associated with a vehicle parking point 500 before creating a vehicle parking point geo coordinate for the serviceable address. Also, as previously indicated, the handheld 110 or delivery vehicle computing device may receive point geo coordinates as input from the driver of the delivery vehicle 115.

iii. Exemplary Street Network Connection Point Geo Coordinates

In one embodiment, in addition to determining a parcel drop-off point geo coordinate and/or a vehicle parking point geo coordinate, the street network connection point geo coordinate for the street network connection point 400 is determined. As discussed above, the term street network connection point 400 may refer to, for example, the location at which the serviceable address connects to the street network 405. Accordingly, the term street network connection point geo coordinate may refer to, for example, information identifying the street network connection point 400 that may include longitude and latitude coordinates, geocodes, altitude, course, speed, distance, UTC, and date information, or the like. To determine a street network connection point geo coordinate for a street network connection point 400, the mapping system 100 calculates the closest point on the street network 405 to the parcel drop-off point 410, based at least in part on the parcel drop-off point geo coordinate.

D. Exemplary Point Objects

In various embodiments, the information sets for the points need to be stored and easily accessed route determination and optimization.

i. Exemplary Parcel Drop-Off Point Object

In various embodiments, the parcel drop-off point information and street network connection point information may be stored in a variety of ways (Block 710 of FIG. 7). For example, as shown in FIG. 6A and in Table 1 below, a parcel drop-off point object may be used to store (a) the serviceable address, (b) the latitude and longitude of a parcel drop-off point 410 associated with the serviceable address (e.g., parcel drop-off point geo coordinate), (c) the latitude and longitude type (e.g., latitude and longitude of a parcel drop-off point 410 or latitude and longitude of a vehicle parking point 500) of the parcel drop-off point 410 associated with the serviceable address, (d) the latitude and longitude of a street network connection point 400 associated with the serviceable address (e.g., street network connection point geo coordinate), (e) the travel distance from the parcel drop-off point 410 to the street network connection point 400 (e.g., travel distance from the parcel drop-off point 410 to the street network 405), (f) the travel time from the parcel drop-off point 410 to the street network connection point 400 (e.g., travel time from the parcel drop-off point 410 to the street network 405), and (h) the travel speed from the parcel drop-off point 410 to the street network connection point 400 (e.g., travel speed from the parcel drop-off point 410 to the street network 405). An "object" is a data structure, such as an entry in location database 240. It should also be noted that the parcel drop-off point object can be created, accessed, updated, and deleted.

TABLE 1

ROUTABLE POINT OBJECT

SERVICEABLE ADDRESS
LAT/LONG
LAT/LONG TYPE
MAPPABLE POINT LAT/LONG
DISTANCE TO STREET NETWORK
TIME TO STREET NETWORK
SPEED TO STREET NETWORK ii. Exemplary Parcel Drop-Off Point Object and Vehicle Parking Point Object In an embodiment that includes a vehicle parking point 500, the parcel drop-off point information, the street network connection point information, and the vehicle parking point information may be stored in a parcel drop-off point object and a vehicle parking point object (or any other data structure). As shown in FIG. 6B and in Table 2 below, in one embodiment, the parcel drop-off point object may include the serviceable address and the consignee's name associated with the serviceable address. And the vehicle parking point object may store (a) the latitude and longitude of a vehicle parking point 500 associated with the serviceable address (e.g., vehicle parking point geo coordinate), (b) the latitude and longitude type of the vehicle parking point 500 associated with the serviceable address, (c) the latitude and longitude of a street network connection point 400 associated with the serviceable address (e.g., street network connection point geo coordinate), (d) the travel distance from the vehicle parking point 500 to the street network connection point 400 (e.g., travel distance from the vehicle parking point 500 to the street network 405), (e) the travel time from the vehicle parking point 500 to the street network connection point 400 (e.g., travel time from the vehicle parking point 500 to the street network 405), and (f) the travel speed from the vehicle parking point 500 to the street network connection point 400 (e.g., travel speed from the vehicle parking point 500 to the street network 405). In another embodiment, the vehicle parking data object may also store the walk time from the vehicle parking point 500 to the parcel drop-off point 410. Thus, such an embodiment may provide the distance (and time or speed) from the street network connection point 400 to the vehicle parking point 500 and from the vehicle parking point 500 to the parcel drop-off point 410.

The various embodiments, though, are not limited to the above-described data objects. It should also be noted that the parcel drop-off point object and the vehicle parking point object can be created, updated, and deleted.

TABLE 2

PARKABLE POINT OBJECT

LAT/LONG
LAT/LONG TYPE
MAPPABLE POINT LAT/LONG
DISTANCE TO STREET NETWORK
TIME TO STREET NETWORK
SPEED TO STREET NETWORK
ROUTABLE POINT OBJECT

SERVICEABLE ADDRESS
NAME

E. Exemplary Route Determination

In various embodiments, by using data objects storing point information, parcel drop-off point information, street network connection point information, and vehicle parking point information is stored and used to, for example, determine parcel delivery routes. For instance, when a parcel is to be delivered to a location, the serviceable address for the location to which the parcel to be delivered is identified. Identifying the serviceable address may be performed using a variety of methods, such as (a) interrogating a radio frequency identification ("RFID") tag affixed to the parcel, (b) scanning a barcode affixed to the parcel, or (c) receiving the address as input from a parcel handler (Block 715 of FIG. 7).

i. Exemplary Route Determination for Street Network Connection Points and Parcel Drop-Off Points In one embodiment, parcel drop-off point information and street network connection point information are stored and used to determine a parcel delivery route to the serviceable address. Once the mapping system 100 has received the serviceable address (Block 715 of FIG. 7), the mapping system 100 can identify parcel drop-off location information and parcel drop-off location information associated with the serviceable address (Blocks 720 and 725 of FIG. 7). To identify parcel drop-off location information and parcel drop-off location information, the mapping system 100 may query (using the serviceable address) the location database 240 to determine if there are one or more entries (e.g., one or more data objects) stored in association with the serviceable address. For example, the query to the location database 240 may result in an indication that a parcel drop-off point object associated with the serviceable address is being stored in the location database 240. In such a case, the mapping system 100 can retrieve the parcel drop-off point object storing parcel drop-off point information (e.g., including the parcel drop-off point geo coordinate) and the street network connection point information (e.g., including the street network connection point geo coordinate) associated with the serviceable address.

In one embodiment, after identifying the parcel drop-off point information and street network connection point information, the mapping system 100 can determine the distance from an origin point to the street network connection point 400 (e.g., a first distance) and determine the distance from the street network connection point 400 to the parcel drop-off point 410 (e.g., a second distance). The mapping system 100 can then calculate the total distance from the origin point to the parcel drop-off point 410, based at least in part on the first and second distances. It should be noted that the origin point can be any point of reference, including another serviceable address or a parcel hub facility. Thus, in this example, the mapping system 100 (e.g., via the map module 260) can be used to determine the total distance from the origin point to the parcel drop-off point 410.

As indicated, it is not necessary for all serviceable addresses to have data point object associated with them to benefit from embodiments of the present invention. For example, in another embodiment, if the mapping system 100 query of the location database 240 indicates that no entries are associated with the serviceable address (e.g., a delivery vehicle visit has not been made to the serviceable address), the mapping system 100 can still provide approximated information for the serviceable address. Operatively, for example, if no entry is available for a serviceable address in the location database 240, the mapping system 100 can identify the locations on either side of the serviceable address. The mapping system 100 can then query the location database 240 to identify data objects (e.g., database entries) for the locations corresponding to both sides of the serviceable address. If entries exist for the locations on both sides of the serviceable address, the mapping system 100 can use a variety of methods, such as interpolation, to approximate the location of the serviceable address. Additionally, after a delivery vehicle visit is made to the serviceable address based on the approximate location, the handheld 110 or delivery vehicle computing device can determine the actual parcel drop-off point geo coordinate and street network connection point geo coordinate associated with the serviceable address.

In addition to calculating the total distance, the mapping system 100 may use parameters to determine an estimated amount of time necessary to complete a delivery vehicle visit (e.g., a pickup or delivery of a parcel) to the serviceable address. The parameters may include, for example, the average travel speed from the street network connection point 400 to the parcel drop-off point 410. Thus, in various embodiments, this provides precise information as to the distance, travel speeds, and length of time, for example, necessary to complete a delivery vehicle visit to a given serviceable address. Accordingly, the mapping system 100 can determine (a) the time and distance required to drive from the origin point to the street network connection point 400 and (b) the time and distance required to drive (or walk) from the street network connection point 400 to the parcel drop-off point 410.

ii. Exemplary Route Determination for Street Network Connection Points, Vehicle Parking Points, and Parcel Drop-Off Points In another embodiment, parcel drop-off point information, vehicle parking point information, and street network connection point information can be stored and used to determine a parcel delivery route to the serviceable address. For example, once the mapping system 100 has identified or received the serviceable address (Block 715 of FIG. 7), the mapping system 100 can identify parcel drop-off location information, vehicle parking location information, and parcel drop-off location information associated with the serviceable address (Blocks 720 and 725 of FIG. 7). To do so, the mapping system 100 may query the location database 240 (using the serviceable address) to determine if there are one or more entries (e.g., one or more data objects) stored in association with the serviceable address. For example, the query to the location database 240 may result in an indication that a parcel drop-off point object and a vehicle parking point object associated with the serviceable address are being stored in the location database 240. In such a case, the mapping system 100 can retrieve the parcel drop-off point object and the vehicle parking point object—which may include parcel drop-off point information (e.g., including the parcel drop-off point geo coordinate), vehicle parking point information (e.g., including the vehicle parking point geo coordinate), and street network connection point information (e.g., including the street network connection point geo coordinate) associated with the serviceable address.

In one embodiment, after identifying this information, the mapping system 100 can determine the (a) distance from an origin point to the street network connection point 400 (e.g., a first distance), (b) distance from the street network connection point 400 to the vehicle parking point 500 (e.g., a second distance), and (c) distance from the vehicle parking point 500 to the parcel drop-off point 410 (e.g., a third distance). The mapping system 100 can then calculate the total distance from the origin point to the parcel drop-off point 410, based at least in part on the first, second, and third distances. In addition to calculating the total distance, the mapping system 100 may use parameters to determine an estimated amount of time necessary to complete a delivery vehicle visit (e.g., a pickup or delivery of a parcel) to the serviceable address (Block 730). The parameters may include, for example, the average travel speed from the street network connection point 400 to the vehicle parking point 500 and the average walk speed from the vehicle parking point 500 to the parcel drop-off point 410. Accordingly, in various embodiments, this provides precise information as to the distance, travel and walk speeds, and length of time, for example, necessary to complete a delivery vehicle visit to a given serviceable address. With this information, the mapping system 100 can determine (a) the time and distance required to drive from the origin point to the street network connection point 400, (b) the time and distance required to drive from the street network connection point 400 to the vehicle parking point 500, and (c) the time and distance required to walk from the vehicle parking point 500 to the parcel drop-off point 410.

F. Exemplary Route Optimization

In one embodiment, the mapping system 100 can determine the total distance from an origin point (e.g., a serviceable address or a parcel hub facility) to each serviceable address. In that regard, the mapping system 100 can also optimize a delivery route, for example, using a set of serviceable addresses (Block 735). For instance, the mapping system 100 can create time and distance matrices using the respective parcel drop-off point geo coordinates, respective street network connection point geo coordinates, and/or respective vehicle parking point geo coordinates for a set of serviceable addresses to optimize a delivery route.

The optimization methods may include morning optimizations (e.g., optimizations that occur before a driver leaves the building to start his or her day) that take into account, for example, the work assigned to the driver's route, specifics of the work, parcel commit times, specifics of the work's location, driver breaks, and various other route parameters. The optimization methods may also include dynamic optimizations (e.g., optimizations that occur after a driver leaves the building to start his or her day) that take into account, for example, the work assigned to the driver's route, specifics of the work, parcel commit times, specifics of the work's location, driver breaks, the current location of the driver (GPS) and the current time, and various other route parameters.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one memory including program code, the at least one memory and the program code configured to, with the processor, cause the apparatus to at least:
   receive actual location point information collected during one or more visits to a serviceable address, (a) the serviceable address being associated with street network connection information as part of a digital map and (b) the street network connection information comprising a street network connection point associated with the serviceable address to travel to or from the street network connection point via a street network that is represented as part of the digital map;
   determine an actual location point for the serviceable address based at least in part on the actual location point information collected during the one or more visits to the serviceable address, the actual location point associated with the serviceable address to travel to or from the street network connection point; and
   store a record for the serviceable address comprising the actual location point and the street network connection point.

2. The apparatus of claim 1, wherein (a) the actual location point comprises an actual location point geo coordinate, (b) the street network connection point comprises a street network connection point geo coordinate, and (c) wherein the memory and program code are further configured to, with the processor, cause the apparatus to:
   determine a first distance from an origin point to the street network connection point based at least in part on the street network connection point geo coordinate;
   determine a second distance from the street network connection point to the actual location point based at least in part on the street network connection point geo coordinate and the actual location point geo coordinate; and
   determine a total distance from the origin point to the actual location point, wherein the total distance is based at least in part on the first distance and second distance.

3. The apparatus of claim 1, wherein the actual location point information further comprises (a) a travel time between the street network connection point and the actual location point or (b) a travel speed between the street network connection point and the actual location point.

4. The apparatus of claim 3, wherein the memory and program code are further configured to, with the processor, cause the apparatus to determine an actual delivery time based at least in part on the total distance.

5. The apparatus of claim 1, wherein the actual location point information is collected while at least one of (a) a vehicle or (b) a vehicle driver is operating proximate the actual location point.

6. The apparatus of claim 1, wherein (a) the street network connection point is represented within a street network of the digital map and (b) the actual location point is represented outside the street network of the digital map.

7. The apparatus of claim 1, wherein both the street network connection point and the actual location point are represented within a street network of the digital map.

8. The apparatus of claim 2, wherein the (a) actual location point geo coordinate comprises an actual location point geocode and (b) street network connection point geo coordinate comprises a street network connection point geocode.

9. A computer program product comprising at least one computer-readable storage medium having computer-readable program code portions stored therein, the computer-readable program code portions comprising:
   an executable portion configured to receive actual location point information collected during one or more visits to a serviceable address, (a) the serviceable address being associated with street network connection information as part of a digital map and (b) the street network connection information comprising a street network connection point associated with the serviceable address to travel to or from the street network connection point via a street network that is represented as part of the digital map;
   an executable portion configured to determine an actual location point for the serviceable address based at least in part on the actual location point information collected during the one or more visits to the serviceable address, the actual location point associated with the serviceable address to travel to or from the street network connection point; and
   an executable portion configured to store a record for the serviceable address comprising the actual location point and the street network connection point.

10. The computer program product of claim 9, (a) wherein the actual location point comprises an actual location point geo coordinate, (b) wherein the street network connection point comprises a street network connection point geo coordinate, and (c) further comprising:
   an executable portion configured to determine a first distance from an origin point to the street network connection point based at least in part on the street network connection point geo coordinate;
   an executable portion configured to determine a second distance from the street network connection point to the actual location point based at least in part on the street network connection point geo coordinate and the actual location point geo coordinate; and
   an executable portion configured to determine a total distance from the origin point to the actual location point, wherein the total distance is based at least in part on the first distance and second distance.

11. The computer program product of claim 9, wherein the actual location point information further comprises (a) a travel time between the street network connection point and the actual location point or (b) a travel speed between the street network connection point and the actual location point.

12. The computer program product of claim 11, further comprising an executable portion configured to determine an actual delivery time based at least in part on the total distance.

13. The computer program product of claim 9, wherein the actual location point information is collected while at least one of (a) a vehicle or (b) a vehicle driver is operating proximate the actual location point.

14. The computer program product of claim 9, wherein (a) the street network connection point is represented within a street network of the digital map and (b) the actual location point is represented outside the street network of the digital map.

15. The computer program product of claim 9, wherein both the street network connection point and the actual location point are represented within a street network of the digital map.

16. The computer program product of claim 10, wherein the (a) parcel drop-off point geo coordinate comprises an actual location point geocode and (b) street network connection point geo coordinate comprises a street network connection point geocode.

17. A method comprising:
   receiving, via one or more processors, actual location point information collected during one or more visits to a serviceable address, (a) the serviceable address being associated with street network connection information as part of a digital map and (b) the street network connection information comprising a street network connection point associated with the serviceable address to travel to or from the serviceable address street network connection point via a street network that is represented as part of the digital map;
   determining, via the one or more processors, an actual location point for the serviceable address based at least in part on the actual location point information collected during the one or more visits to the serviceable address, the actual location point associated with the serviceable address to travel to or from the street network connection point; and
   storing, via the one or more processors, a record for the serviceable address comprising the actual location point and the street network connection point.

18. The method of claim 17, (a) wherein the actual location point comprises an actual location point geo coordinate, (b) wherein the street network connection point comprises a street network connection point geo coordinate, and (c) further comprising:
   determining, via the one or more processors, a first distance from an origin point to the street network connection point based at least in part on the street network connection point geo coordinate;
   determining, via the one or more processors, a second distance from the street network connection point to the actual location point based at least in part on the street network connection point geo coordinate and the actual location point geo coordinate; and
   determining, via the one or more processors, a total distance from the origin point to the actual location point, wherein the total distance is based at least in part on the first distance and second distance.

19. The method of claim 17, wherein the actual location point information further comprises (a) a travel time between the street network connection point and the actual location point or (b) a travel speed between the street network connection point and the actual location point.

20. The method of claim 19, wherein the one or more processors are further configured to determine an actual delivery time based at least in part on the total distance.

21. The method of claim 17, wherein the actual location point information is collected while at least one of (a) a vehicle or (b) a vehicle driver is operating proximate the actual location point.

22. The method of claim 17, wherein (a) the street network connection point is represented within a street network of the digital map and (b) the actual location point is represented outside the street network of the digital map.

23. The method of claim 17, wherein both the street network connection point and the actual location point are represented within a street network of the digital map.

24. The method of claim 18, wherein the (a) actual location point geo coordinate comprises an actual location point geocode and (b) street network connection point geo coordinate comprises a street network connection point geocode.

* * * * *

UNITED STATES PATENT AND TRADEMARK OFFICE
CERTIFICATE OF CORRECTION

PATENT NO. : 9,082,100 B2
APPLICATION NO. : 14/148056
DATED : July 14, 2015
INVENTOR(S) : Hurley et al.

Page 1 of 1

It is certified that error appears in the above-identified patent and that said Letters Patent is hereby corrected as shown below:

In The Claims

Column 19

Line 32, delete "serviceable address"

Signed and Sealed this
Fifth Day of January, 2016

Michelle K. Lee
*Director of the United States Patent and Trademark Office*